United States Patent
Mansour et al.

(10) Patent No.: US 11,901,983 B1
(45) Date of Patent: Feb. 13, 2024

(54) SELECTIVELY ASSIGNING UPLINK TRANSMISSION LAYERS

(71) Applicant: T-Mobile Innovations LLC, Overland Park, KS (US)

(72) Inventors: Nagi A. Mansour, Arlington, VA (US); Kafi I. Hassan, Fairfax, VA (US); Sandeep Mangrulkar, Chantilly, VA (US); Akin Ozozlu, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 52 days.

(21) Appl. No.: 17/204,415

(22) Filed: Mar. 17, 2021

(51) Int. Cl.
  *H04B 7/06* (2006.01)
  *H04W 72/1268* (2023.01)
  *H04L 5/00* (2006.01)

(52) U.S. Cl.
  CPC ......... *H04B 7/0608* (2013.01); *H04L 5/0007* (2013.01); *H04W 72/1268* (2013.01)

(58) Field of Classification Search
  CPC .. H04B 7/0608; H04B 7/0697; H04B 5/0007; H04W 72/1268; H04L 5/0007; H04L 5/0023; H04L 5/0025; H04L 5/00; H04L 1/06; H04L 25/0204; H04L 25/03929
  See application file for complete search history.

(56) References Cited

U.S. PATENT DOCUMENTS

| | | | | |
|---|---|---|---|---|
| 5,995,487 A * | 11/1999 | Weaver | .............. | H04Q 11/0478 370/395.21 |
| 6,952,398 B1 * | 10/2005 | Fahim | ................. | H04L 41/0896 370/248 |
| 7,346,043 B1 * | 3/2008 | Olshansky | ........... | H04Q 3/0045 709/240 |
| 8,780,771 B2 * | 7/2014 | Kim | ..................... | H04B 7/0671 370/344 |
| 9,596,053 B1 * | 3/2017 | Marupaduga | ......... | H04W 88/08 |
| 9,867,194 B2 * | 1/2018 | Kadous | ............. | H04W 72/1284 |
| 9,887,864 B1 * | 2/2018 | Han | ........................ | H04W 4/30 |
| 9,929,838 B2 * | 3/2018 | Nam | ..................... | H04L 5/0028 |
| 10,250,366 B2 * | 4/2019 | Kim | ..................... | H04W 72/042 |
| 10,790,885 B1 * | 9/2020 | Raghunathan | .......... | H04L 1/187 |
| 10,827,423 B1 * | 11/2020 | Manganiello | ......... | H04W 48/20 |
| 11,038,639 B1 * | 6/2021 | Song | ..................... | H04L 5/0069 |
| 11,057,882 B1 * | 7/2021 | Marupaduga | ........... | H04W 4/90 |
| 11,140,639 B1 * | 10/2021 | Marupaduga | ....... | H04W 52/367 |
| 11,166,166 B1 * | 11/2021 | Parihar | .................... | H04B 7/06 |
| 11,265,945 B1 * | 3/2022 | Marupaduga | ......... | H04W 24/08 |
| 11,374,633 B2 * | 6/2022 | Weissman | ............ | H04B 7/0604 |
| 11,374,634 B2 * | 6/2022 | Miao | ..................... | H04B 7/086 |
| 11,432,263 B2 * | 8/2022 | Lee | ......................... | H04W 4/40 |

(Continued)

OTHER PUBLICATIONS

U.S. Appl. No. 63/054,227 (Year: 2020).*

*Primary Examiner* — Dung B Huynh
(74) *Attorney, Agent, or Firm* — Jones Robb, PLLC

(57) ABSTRACT

Selectively assigning uplink transmission layers for uplink transmissions from wireless devices to access nodes based on any combination of uplink usage characteristics and signal conditions. Wireless devices configured to transmit uplink data on one or more orthogonal transmission layers from each antenna. Instructing wireless devices to add transmission layers is based on an uplink usage and other characteristics such as type of transmission, time of day, distance from serving access node, etc.

13 Claims, 5 Drawing Sheets

(56) References Cited

U.S. PATENT DOCUMENTS

| | | | |
|---|---|---|---|
| 2003/0152096 A1* | 8/2003 | Chapman | H04L 47/803 370/468 |
| 2006/0225089 A1* | 10/2006 | Ikeda | H04W 52/24 725/25 |
| 2007/0105563 A1* | 5/2007 | Ro | H04W 28/24 455/452.2 |
| 2007/0209067 A1* | 9/2007 | Fogel | H04L 65/1104 726/11 |
| 2007/0258361 A1* | 11/2007 | McEwen | H04L 47/15 370/389 |
| 2007/0263818 A1* | 11/2007 | Sumioka | H04L 65/611 379/201.01 |
| 2008/0225708 A1* | 9/2008 | Lange | H04L 47/2475 370/252 |
| 2008/0318606 A1* | 12/2008 | Tsutsui | H04B 7/0632 455/500 |
| 2009/0028109 A1* | 1/2009 | Huang | H04N 21/2385 725/62 |
| 2009/0167947 A1* | 7/2009 | Satoh | G06F 13/3625 348/E5.062 |
| 2009/0168715 A1* | 7/2009 | Cai | H04W 72/02 370/329 |
| 2010/0014495 A1* | 1/2010 | Hirano | H04W 48/18 370/338 |
| 2010/0039928 A1* | 2/2010 | Noh | H04L 25/03923 370/210 |
| 2010/0120359 A1* | 5/2010 | Agarwal | H04B 7/18539 455/12.1 |
| 2010/0190506 A1* | 7/2010 | To | H04L 5/0042 455/452.1 |
| 2010/0208588 A1* | 8/2010 | Vinokour | H04L 47/30 370/230.1 |
| 2010/0291917 A1* | 11/2010 | Wang | H04B 7/0695 455/422.1 |
| 2011/0058473 A1* | 3/2011 | Krym | H04W 48/06 370/232 |
| 2012/0014318 A1* | 1/2012 | Luo | H04L 5/0051 375/267 |
| 2012/0176247 A1* | 7/2012 | Feldstein | H04N 21/43615 340/654 |
| 2012/0188875 A1* | 7/2012 | Stamoulis | H04W 72/563 370/235 |
| 2012/0265898 A1* | 10/2012 | Kruglick | H04W 28/24 709/235 |
| 2012/0288025 A1* | 11/2012 | Ogawa | H04W 28/04 375/267 |
| 2013/0021897 A1* | 1/2013 | Wu | H04L 1/06 370/216 |
| 2013/0064089 A1* | 3/2013 | Wu | H04W 28/0289 370/235 |
| 2013/0143580 A1* | 6/2013 | Michel | H04W 52/0206 455/446 |
| 2013/0268984 A1* | 10/2013 | Salinger | H04L 47/806 725/109 |
| 2013/0329583 A1* | 12/2013 | Vrzic | H04W 36/30 370/252 |
| 2013/0336230 A1* | 12/2013 | Zou | H04W 76/14 370/329 |
| 2014/0087749 A1* | 3/2014 | Mar | G06N 3/043 455/452.2 |
| 2014/0098748 A1* | 4/2014 | Chan | H04W 72/541 370/329 |
| 2014/0146128 A1* | 5/2014 | Shin | H04L 65/80 348/14.09 |
| 2014/0256343 A1* | 9/2014 | Shaikh | H04L 65/80 455/452.2 |
| 2014/0286173 A1* | 9/2014 | Bhandari | H04L 45/02 370/238 |
| 2014/0301315 A1* | 10/2014 | Wang | H04W 16/14 370/329 |
| 2014/0323133 A1* | 10/2014 | Yeh | H04N 7/147 455/437 |
| 2014/0348260 A1* | 11/2014 | Lorca Hernando | H04B 7/0686 375/295 |
| 2014/0376444 A1* | 12/2014 | Park | H04W 4/06 370/312 |
| 2015/0016266 A1* | 1/2015 | Dumitrescu | H04L 47/6275 370/236 |
| 2015/0124668 A1* | 5/2015 | Huang | H04L 5/0044 370/280 |
| 2015/0222331 A1* | 8/2015 | Zhang | H04B 7/0874 375/267 |
| 2015/0372977 A1* | 12/2015 | Yin | H04L 63/20 726/1 |
| 2016/0095156 A1* | 3/2016 | Mitra | H04W 48/16 370/329 |
| 2016/0211898 A1* | 7/2016 | Cai | H04B 7/0617 |
| 2016/0269092 A1* | 9/2016 | Wich | H03F 3/24 |
| 2017/0019848 A1* | 1/2017 | Hu | H04W 72/085 |
| 2017/0086164 A1* | 3/2017 | Park | G01S 19/48 |
| 2017/0093675 A1* | 3/2017 | Chuang | H04L 43/18 |
| 2017/0094604 A1* | 3/2017 | Yang | H04W 72/23 |
| 2017/0094685 A1* | 3/2017 | Noh | H04W 74/0816 |
| 2017/0171771 A1* | 6/2017 | Jung | H04W 24/10 |
| 2017/0257823 A1* | 9/2017 | Ashwood-Smith | H04B 17/12 |
| 2017/0265205 A1* | 9/2017 | HomChaudhuri | H04W 72/042 |
| 2017/0280362 A1* | 9/2017 | Persson | H04W 36/36 |
| 2017/0288949 A1* | 10/2017 | Jactat | H04W 76/16 |
| 2017/0311182 A1* | 10/2017 | Tenny | H04L 5/0055 |
| 2018/0063747 A1* | 3/2018 | Anchan | H04L 65/1053 |
| 2018/0077704 A1* | 3/2018 | Adachi | H04W 72/10 |
| 2018/0124725 A1* | 5/2018 | Ghanbarinejad | H04B 7/088 |
| 2018/0124771 A1* | 5/2018 | Mok | H04W 36/0072 |
| 2018/0124789 A1* | 5/2018 | Yerramalli | H04L 5/0048 |
| 2018/0175977 A1* | 6/2018 | Song | H04L 5/003 |
| 2018/0302912 A1* | 10/2018 | Chen | H04W 72/535 |
| 2018/0324007 A1* | 11/2018 | Nammi | H04B 7/0482 |
| 2018/0332542 A1* | 11/2018 | Wang | H04L 5/0007 |
| 2018/0359760 A1* | 12/2018 | Su | H04W 72/082 |
| 2018/0376383 A1* | 12/2018 | Belghoul | H04W 76/19 |
| 2019/0036746 A1* | 1/2019 | Hwang | H04L 5/0007 |
| 2019/0082424 A1* | 3/2019 | Nammi | H04B 7/0486 |
| 2019/0140706 A1* | 5/2019 | Chang | H04W 24/02 |
| 2019/0141738 A1* | 5/2019 | Namba | H04W 72/14 |
| 2019/0150177 A1* | 5/2019 | Chen | H04W 72/1268 370/329 |
| 2019/0159049 A1* | 5/2019 | Kim | H04B 7/0413 |
| 2019/0174366 A1* | 6/2019 | Susitaival | H04W 76/19 |
| 2019/0174571 A1* | 6/2019 | Deenoo | H04W 36/30 |
| 2019/0207858 A1* | 7/2019 | Xu | H04L 47/2441 |
| 2019/0215843 A1* | 7/2019 | Liu | H04W 72/085 |
| 2019/0320491 A1* | 10/2019 | Shukair | H04W 72/1268 |
| 2019/0335440 A1* | 10/2019 | Tang | H04W 72/0406 |
| 2019/0335487 A1* | 10/2019 | Son | H04L 1/0078 |
| 2019/0342768 A1* | 11/2019 | Xu | H04B 7/0639 |
| 2019/0357219 A1* | 11/2019 | Wong | H04W 72/21 |
| 2019/0394660 A1* | 12/2019 | He | H04B 7/088 |
| 2020/0036503 A1* | 1/2020 | Liu | H04L 27/2613 |
| 2020/0045519 A1* | 2/2020 | Raleigh | H04M 15/765 |
| 2020/0045577 A1* | 2/2020 | Yu | H04W 28/0252 |
| 2020/0068543 A1* | 2/2020 | Rong | H04W 80/08 |
| 2020/0092073 A1* | 3/2020 | Papasakellariou | H04L 5/0094 |
| 2020/0107401 A1* | 4/2020 | Kumar | H04W 60/005 |
| 2020/0127895 A1* | 4/2020 | Sun | H04L 41/0893 |
| 2020/0128579 A1* | 4/2020 | Talarico | H04W 4/70 |
| 2020/0154459 A1* | 5/2020 | Mukherjee | H04L 65/80 |
| 2020/0178127 A1* | 6/2020 | Ravichandran | H04W 36/0022 |
| 2020/0186449 A1* | 6/2020 | Tofighbakhsh | H04L 43/04 |
| 2020/0187023 A1* | 6/2020 | Hwang | H04W 24/02 |
| 2020/0187134 A1* | 6/2020 | Noh | H04W 52/42 |
| 2020/0213057 A1* | 7/2020 | Bala | H04L 27/2636 |
| 2020/0244292 A1* | 7/2020 | Park | H04B 7/0486 |
| 2020/0260300 A1* | 8/2020 | Cirik | H04W 24/08 |
| 2020/0280861 A1* | 9/2020 | Choi | H04W 4/80 |
| 2020/0287647 A1 | 9/2020 | Park et al. | |
| 2020/0351208 A1* | 11/2020 | Lee | H04L 47/20 |
| 2020/0351705 A1* | 11/2020 | Chae | H04W 72/042 |
| 2020/0396621 A1* | 12/2020 | Park | H04B 7/024 |
| 2021/0006299 A1* | 1/2021 | Kadous | H04W 24/02 |
| 2021/0028984 A1* | 1/2021 | Da Silva | H04W 24/08 |

(56) References Cited

U.S. PATENT DOCUMENTS

| | | |
|---|---|---|
| 2021/0029644 A1* | 1/2021 | Cho .................. H04W 88/06 |
| 2021/0050666 A1* | 2/2021 | Cirik ................. H01Q 3/24 |
| 2021/0051699 A1* | 2/2021 | Bhamri ............ H04L 5/0035 |
| 2021/0068140 A1* | 3/2021 | Yang ............... H04L 5/0044 |
| 2021/0105110 A1* | 4/2021 | Kim ................. H04L 5/0048 |
| 2021/0143870 A1* | 5/2021 | Faxér .............. H04W 72/082 |
| 2021/0144076 A1* | 5/2021 | Lee ................. H04L 43/067 |
| 2021/0227505 A1* | 7/2021 | Sarkis .............. H04L 1/0072 |
| 2021/0242914 A1* | 8/2021 | Park ................ H04B 7/0486 |
| 2021/0250858 A1* | 8/2021 | Chen ............... H04W 72/23 |
| 2021/0267005 A1* | 8/2021 | Gopal .............. H04B 7/0802 |
| 2021/0344397 A1* | 11/2021 | Lee ................. H04B 7/0626 |
| 2021/0352688 A1* | 11/2021 | Luo ................. H04W 74/0808 |
| 2021/0391900 A1* | 12/2021 | Mukherjee ....... H04B 7/0473 |
| 2021/0400648 A1* | 12/2021 | Wu ................. H04B 17/382 |
| 2022/0007418 A1* | 1/2022 | Liu ................. H04W 72/044 |
| 2022/0022223 A1* | 1/2022 | Yang ............... H04L 5/0048 |
| 2022/0022229 A1* | 1/2022 | Wong .............. H04W 72/20 |
| 2022/0052742 A1* | 2/2022 | Huang ............. H04L 5/0091 |
| 2022/0053477 A1* | 2/2022 | Yao ................. H04L 25/0224 |
| 2022/0069879 A1* | 3/2022 | Wernersson ..... H04L 5/0094 |
| 2022/0078887 A1* | 3/2022 | Sevindik .......... H04W 88/10 |
| 2022/0095085 A1* | 3/2022 | Volkerink ........ H04W 56/001 |
| 2022/0116829 A1* | 4/2022 | Singh .............. H04W 36/30 |
| 2022/0124591 A1* | 4/2022 | Nielsen ........... H04B 1/1027 |
| 2022/0124643 A1* | 4/2022 | Wang .............. H04W 52/241 |
| 2022/0147133 A1* | 5/2022 | Ranjan ............ G06F 1/3228 |
| 2022/0174589 A1* | 6/2022 | Bellamkonda ... H04B 7/0617 |
| 2022/0182198 A1* | 6/2022 | Geekie ............ H04L 5/0023 |
| 2022/0182978 A1* | 6/2022 | Takahashi ....... H04L 5/0098 |
| 2022/0190872 A1* | 6/2022 | Hannebauer .... H04N 21/2381 |
| 2022/0191081 A1* | 6/2022 | Kim ................ H04W 72/12 |
| 2022/0201783 A1* | 6/2022 | Jones .............. H04L 5/001 |
| 2022/0376954 A1* | 11/2022 | Lee ................ H04L 1/206 |

* cited by examiner

SELECTIVELY ASSIGNING UPLINK TRANSMISSION LAYERS

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mmWave) networks, as well as older legacy networks. In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. There are various potential deployments of EN-DC, such as one-to-one (where a 4G eNodeB is colocated with a 5G gNodeB at the same cell site or radio access network), or distributed or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Further, in an effort to boost coverage and enhance throughput in wireless networks, technologies such as multiple-input multiple-output (MIMO) have been developed. With the evolution of 5G, mmWave, and sub-6G, increasing numbers of antennae can be used to form beams or perform MIMO operating modes, including single-user (SU-MIMO) and/or a multi-user (MU-MIMO) mode. In a recent evolution of MIMO technology, known as massive MIMO or large-scale MIMO, an access node may utilize hundreds of antennae to simultaneously transmit each of a plurality of different data streams to a corresponding plurality of wireless devices. Since MIMO utilizes orthogonal transmission layers to transmit multiple streams to wireless devices, massive MIMO is able to leverage the hundreds of antennae to transmit many streams across many orthogonal layers. As wireless device technology improves, increasing numbers of wireless devices are using higher transmit powers to transmit uplink data. For example, uplink MU-MIMO is a new service that applies MIMO technology to transmitting uplink data using a plurality of layers or streams.

There can be issues related to uplink performance, caused by various factors including a type of transmission being used, a distance of a wireless device from a serving access node (such as a eNodeB, gNodeB, etc.), frequencies being used for uplink transmission, and so on. These issues can be compounded by using MIMO in heterogeneous networks, such as those wireless networks containing access nodes having different capabilities, such as EN-DC, particularly as new and/or different frequency bands are assigned to sectors in the wireless network.

OVERVIEW

Exemplary embodiments described herein include methods, systems, and processing nodes for selectively assigning uplink transmission layers based on uplink usage. Another exemplary method for selectively assigning uplink transmission layers includes determining that an uplink usage of a wireless device meets a threshold, and instructing the wireless device to utilize an additional orthogonal layer for uplink transmissions.

Another exemplary method for selectively assigning uplink transmission layers includes monitoring an uplink usage of one or more wireless devices and, based on the uplink usage, adjusting a number of transmission layers utilized for uplink transmissions from the wireless device.

Another exemplary method for selectively assigning uplink transmission layers includes determining that a wireless device within a threshold distance of a serving access node has an uplink usage that meets a threshold, and instructing the wireless device to utilize one or more additional transmission layers for uplink transmissions.

These exemplary operations described herein may be performed by a processing node within a system, such as a telecommunication system. For example, an exemplary system for selectively assigning uplink transmission layers includes at least a processing node and a processor coupled to the processing node. The processing node can be configured to perform operations including any of the operations described herein in any combination.

For example, an exemplary processing node can be configured to perform operations including determining that an uplink usage of a wireless device meets a threshold, and instructing the wireless device to utilize an additional orthogonal layer for uplink transmissions.

Another exemplary processing node can be configured to perform operations including monitoring an uplink usage of one or more wireless devices and, based on the uplink usage, adjusting a number of transmission layers utilized for uplink transmissions from the wireless device.

Another exemplary processing node can be configured to perform operations including determining that a wireless device within a threshold distance of a serving access node has an uplink usage that meets a threshold, and instructing the wireless device to utilize one or more additional transmission layers for uplink transmissions.

DETAILED DESCRIPTION

Figure 1:
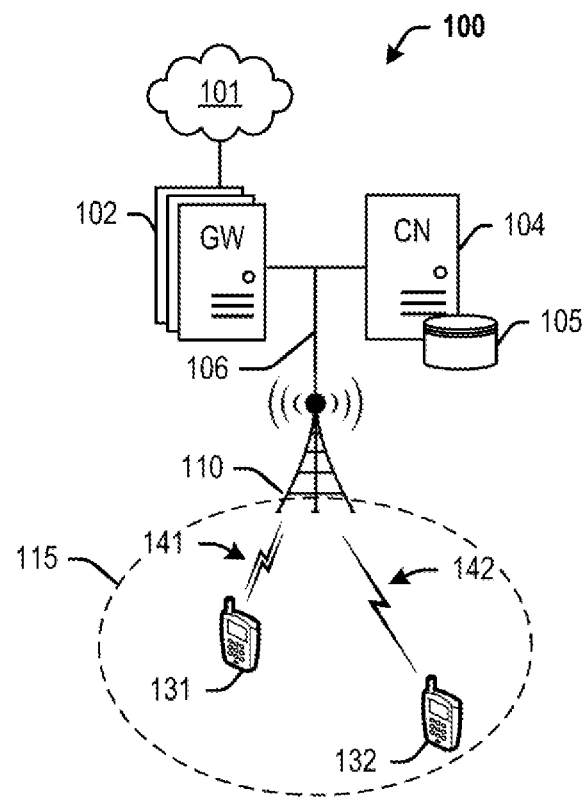
FIG. 1 depicts an exemplary system for selectively assigning uplink transmission layers.

The following disclosure provides methods and systems for selectively assigning uplink transmission layers for uplink transmissions from wireless devices to access nodes based on any combination of uplink usage characteristics and signal conditions. A wireless device may be configured to utilize one or more antennae towards uplink transmissions, and can further be configured to transmit uplink data on one or more orthogonal transmission layers from each antenna. Exemplary embodiments described herein include instructing wireless devices to add transmission layers (using each antenna) based on an uplink usage and other characteristics such as type of transmission, time of day, distance from serving access node, and so on. In an exemplary embodiment, each additional transmission layer is separated from the existing transmission layer by a code division multiplexing (CDM) code. Further, based on the distance from the serving access node, certain frequencies may be encouraged or discouraged for uplink transmissions. For example, while higher frequencies can be used for uplink transmissions from wireless devices closer to an access node, as the distance increases, the wireless devices can be instructed to instead utilize lower frequencies for uplink transmissions. Multiple additional transmission layers using the lower frequencies can be assigned to improve uplink throughput and maximize uplink coverage and capacity. Further, since using multiple antennae for uplink transmissions reduces a total amount of power available per antenna, adding transmissions layers to a single antenna (e.g. lower-frequency antenna) while disabling other antennae (e.g. higher-frequency antennae) can help maintain uplink transmission power, thereby ensuring higher uplink quality of service. This is particularly relevant in EN-DC networks where different antennae of the wireless device are assigned to different RATs or frequency bands. Further, a noise rise associated with uplink transmissions can be monitored (e.g. by measuring at the serving access node), and uplink transmission layers can be limited based on the noise rise meeting one or more thresholds. In non-dual-connectivity sectors (e.g. those served by a single RAT or type of access node), additional transmission layers can be assigned without deactivating different antennae of the wireless device.

Exemplary heterogeneous dual-connectivity wireless networks described herein include access nodes that are capable of communicating using a plurality of wireless air interfaces or RATs. For example, an access node can include a combination of a 4G eNodeB and a 5G gNodeB. In other words, the access node can be configured to communicate using 4G LTE as well using 5G NR. In some embodiments, the access node can include a 4G eNodeB coupled to a plurality of 5G gNodeBs (one-to-many or distributed configuration). In similar embodiments, the access nodes can be selected from either the eNodeB or one of the 5G gNodeBs. As further described herein, the access nodes can be part of the same or different cell sites or radio access networks (RANs), each RAN being served by a different cell site router. Thus, the communication channel for which the transmit power is adjusted can utilize two or more RATs, such that the density of access nodes that deploy at least one of the two or more RATs is determined, and the transmit power for wireless devices utilizing said at least one of the two or more RATs is adjusted. Different RAN configurations for EN-DC capable access nodes are described, with each RAN configuration enabling participation in dual-connectivity using at least two RATs. For example, each access node can include a primary access node configured to deploy carriers utilizing a first RAT, and the primary access node is coupled to one or more secondary access nodes, each secondary access node configured to deploy carriers utilizing a second RAT. Alternatively, each access node comprises a secondary access node configured to deploy carriers utilizing the second RAT, the secondary access node being coupled to a primary access node configured to deploy carriers utilizing the first RAT.

Therefore, a method as described herein for selectively assigning uplink transmission layers includes determining that an uplink usage of a wireless device meets a threshold, and instructing the wireless device to utilize an additional orthogonal layer for uplink transmissions. Another method for selectively assigning uplink transmission layers can include monitoring an uplink usage of one or more wireless devices, and based on the uplink usage, adjusting a number of transmission layers utilized for uplink transmissions from the wireless device. Alternatively or in addition, a method for selectively assigning uplink transmission layers can include determining that a wireless device within a threshold distance of a serving access node has an uplink usage that meets a threshold, and instructing the wireless device to utilize additional transmission layers for uplink transmissions. As described herein, the wireless device can be configured to utilize a first antenna for the uplink transmissions, and the methods can further include instructing the wireless device to utilize the first antenna for the additional orthogonal layer. Further, the wireless device can be configured to utilize a first antenna for uplink transmissions using a first radio access technology (RAT) and a second antenna uplink transmissions using a second RAT, wherein the first RAT utilizes a lower frequency than the second RAT. In this embodiment, the method can further include determining that the wireless device is within than a threshold distance from a serving access node, and instructing the wireless device to utilize the first antenna for the additional orthogonal layer. The method can further include determining that the wireless device is further than a threshold distance from a serving access node, instructing the wireless device to stop transmitting uplink data via the second antenna, and instructing the wireless device to utilize the first antenna for the additional orthogonal layer. As further described herein, determining that an uplink usage of a wireless device meets a threshold can be based on a resource consumption of the wireless device. Alternatively or in addition, determining that an uplink usage of a wireless device meets a threshold is based on a type of the uplink transmissions. Further, determining that an uplink usage of a wireless device meets a threshold is based on a time of day.

These and other embodiments are further described herein and with reference to FIGS. 1-6.

FIG. 1 depicts an exemplary system 100 comprising a communication network 101, gateway 102, controller node 104, access node 110, and wireless devices 131-132. In this exemplary embodiment, access node 110 may be a macrocell access node configured to deploy one or more wireless air interfaces to which wireless devices 131-132 can attach and access network services from network 101. Further, access node 110 may be configured to deploy the at least two wireless air interfaces using dual connectivity. For example, access node 110 can include a combination of an eNodeB and a gNodeB, such that access node 110 is configured to deploy a wireless air interface using a first RAT (e.g. 4G LTE) and a second RAT (e.g. 5G NR). Each RAT can be configured to utilize a different frequency band or sub-band, a different channel size or bandwidth, and so on. For example, the 5G NR wireless air interface can be configured to utilize higher frequencies and larger channel bandwidths than the 4G LTE wireless air interface. Further, access node 110 can be configured to communicate using both RATs at the same time. For example, dual connections can be set up with wireless devices 131-132 using both 4G and 5G wireless air interfaces, with the 4G wireless air interface being used to transmit control information, and the 5G wireless air interface being used to transmit data information. Although only access node 110 and wireless devices 131-132 are illustrated in FIG. 1, system 100 can include various other combinations of carriers/wireless air interfaces, antenna elements, access nodes, and wireless devices, as may be evident to those having ordinary skill in the art in light of this disclosure.

In an exemplary embodiment, system 100 is further is configured to perform operations for selectively assigning uplink transmission layers for uplink transmissions from wireless devices 131, 132 to access node 110 based on any combination of uplink usage characteristics and signal conditions. Each of wireless devices 131, 132 may be configured to utilize one or more antennae towards uplink transmissions, and can further be configured to transmit uplink data on one or more orthogonal transmission layers from each antenna. In an exemplary embodiment, wireless devices 131-132 are instructed to add transmission layers (using each antenna) based on an uplink usage and other characteristics such as type of transmission, time of day, distance from access node 110, and so on. In an exemplary embodiment, each additional transmission layer is separated from the existing transmission layer by a code division multiplexing (CDM) code.

Further, based on the distance from the access node 110, certain frequencies may be encouraged or discouraged for uplink transmissions. For example, higher frequencies can be used for uplink transmissions from wireless device 131 that is illustrated as being closer to access node 110 than wireless device 132. Thus, wireless device 131 maintains dual-connectivity for its uplink transmission 141, while further being instructed to add additional uplink transmission layers. In an exemplary embodiment, wireless device 131 is instructed to add additional uplink transmission layers for one of the antennae associated with the dual-connectivity transmission, such as an antenna configured to utilize a lower frequency.

Further, wireless device 132 is illustrated as being a further distance from access node 110 relative to wireless device 131. Therefore, wireless device 132 can be instructed to instead utilize lower frequencies for uplink transmissions. This can be enabled by instructing wireless device 132 to utilize only one type of antenna (e.g. the antenna associated with the lower frequencies) for uplink transmissions. Further, wireless device 132 can be instructed to add additional transmission layers using the lower frequency antenna, to improve uplink throughput and maximize uplink coverage and capacity. Since using multiple antennae for uplink transmissions reduces a total amount of power available per antenna, adding transmissions layers to a single antenna (e.g. lower-frequency antenna) while disabling other antennae (e.g. higher-frequency antennae) can help maintain uplink transmission power, thereby ensuring higher uplink quality of service. Whereas this feature may not be required for wireless device 131 that is closer than a threshold distance to access node 110.

Further, a noise rise associated with uplink transmissions can be monitored (e.g. by measuring at the access node 110), and uplink transmission layers can be limited based on the noise rise meeting one or more thresholds. In non-dual-connectivity sectors (e.g. those served by a single RAT or type of access node), additional transmission layers can be assigned without deactivating different antennae of the wireless devices 131, 132.

Thus, an exemplary method performed by system 100 can include determining that an uplink usage of a wireless device 131, 132 meets a threshold, and instructing the wireless device 131, 132 to utilize an additional orthogonal layer for uplink transmissions. Another method for selectively assigning uplink transmission layers can include monitoring an uplink usage of one or more wireless devices 131, 132, and based on the uplink usage, adjusting a number of transmission layers utilized for uplink transmissions from the wireless device 131, 132. Alternatively or in addition, a method for selectively assigning uplink transmission layers can include determining that a wireless device 131 within a threshold distance of a serving access node has an uplink usage that meets a threshold, and instructing the wireless device to utilize additional transmission layers for uplink transmissions. As described herein, the wireless device can be configured to utilize a first antenna for the uplink transmissions, and the methods can further include instructing the wireless device 131, 132 to utilize the first antenna for the additional orthogonal layer. Further, the wireless device 131, 132 can be configured to utilize a first antenna for uplink transmissions using a first radio access technology (RAT) and a second antenna uplink transmissions using a second RAT, wherein the first RAT utilizes a lower frequency than the second RAT. In this embodiment, the method can further include determining that the wireless device 131 is within than a threshold distance from access node 110, and instructing the wireless device 131 to utilize the first antenna for the additional orthogonal layer. The method can further include determining that the wireless device 132 is further than a threshold distance from access node 110, instructing the wireless device 132 to stop transmitting uplink data via the second antenna, and instructing the wireless device 132 to utilize the first antenna for the additional orthogonal layer. As further described herein, determining that an uplink usage of a wireless device 131, 132 meets a threshold can be based on a resource consumption of the wireless device 131, 132. Alternatively or in addition, determining that an uplink usage of a wireless device 131, 132 meets a threshold is based on a type of the uplink transmissions. Further, determining that an uplink usage of a wireless device 131, 132 meets a threshold is based on a time of day.

Access node 110 can be any network node configured to provide communication between wireless devices 131, 132 and communication network 101, including standard access nodes such as a macro-cell access node, base transceiver station, a radio base station, an eNodeB device, an enhanced eNodeB device, an a next generation NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access node 110 may comprise any short range, low power, small-cell access node such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown), using a wireless link or a wired link such as an X2 link. Components of exemplary access node 110 and processing nodes coupled thereto are further described with reference to FIGS. 2-3.

Wireless devices 131, 132 may be any device, system, combination of devices, or other such communication platform capable of communicating wirelessly with access node 110 using one or more frequency bands deployed therefrom. Wireless devices 131, 132 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131, 132. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), S1, optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication link 106 can be direct links or might include various equipment, intermediate components, systems, and networks, such as a cell site router, etc. Communication link 106 may comprise many different signals sharing the same link. Communication link 106 may be associated with many different reference points, such as N1-Nxx, as well as S1-Sxx, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW), a public data network gateway (PGW), and/or a systems architecture evolution gateway (SAE-GW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a control gateway (SGW-C or PGW-C), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as antenna information/dual-connectivity capabilities of wireless devices 131, 132, trends of uplink usage over time, and so on. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, gateway(s) 102, controller node 104, and/or network 101.

Figure 2:
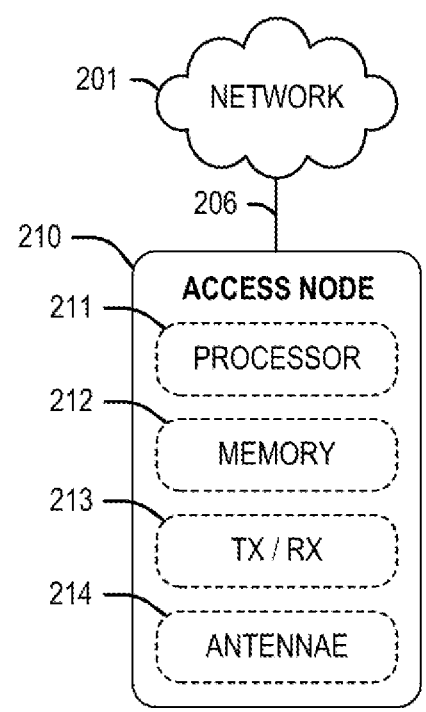
FIG. 2 depicts an exemplary access node for selectively assigning uplink transmission layers.

FIG. 2 depicts an exemplary access node 210. Access node 210 may comprise, for example, a macro-cell access node, such as access node 110 described with reference to FIG. 1. Access node 210 is illustrated as comprising a processor 211, memory 212, a transceiver 213, and antennae 214 (hereinafter referred to as antenna elements 214). Processor 211 executes instructions stored on memory 212, and transceiver 213 (in conjunction with antenna elements 214) enable wireless communication respectively at least two wireless air interfaces, such as 4G LTE and 5G NR. For example, access node 210 may be configured to transmit control information using a first set of antennae elements 214 configured to utilize a 4G LTE interface, and data information using a second set of antennae elements 214 configured to utilize a 5G NR air interface. Alternatively or in addition, each separate air interface maintains its own control and data transmissions. Further, antenna elements 214 may include an array of antenna elements that are configured to deploy air interfaces over one or more wireless sectors, form beams within these sectors, employ multiple-input-multiple-output (MIMO), etc.

In an exemplary embodiment, memory 212 can store instructions for selectively assigning uplink transmission layers by determining that an uplink usage of a wireless device meets a threshold, and instructing the wireless device to utilize an additional orthogonal layer for uplink transmissions. In another exemplary embodiment, memory 212 can store instructions for selectively assigning uplink transmission layers by monitoring an uplink usage of one or more wireless devices, and based on the uplink usage, adjusting a number of transmission layers utilized for uplink transmissions from the wireless device. In another exemplary embodiment, memory 212 can store instructions for selectively assigning uplink transmission layers by determining that a wireless device within a threshold distance of a serving access node has an uplink usage that meets a threshold, and instructing the wireless device to utilize additional transmission layers for uplink transmissions.

Figure 3:
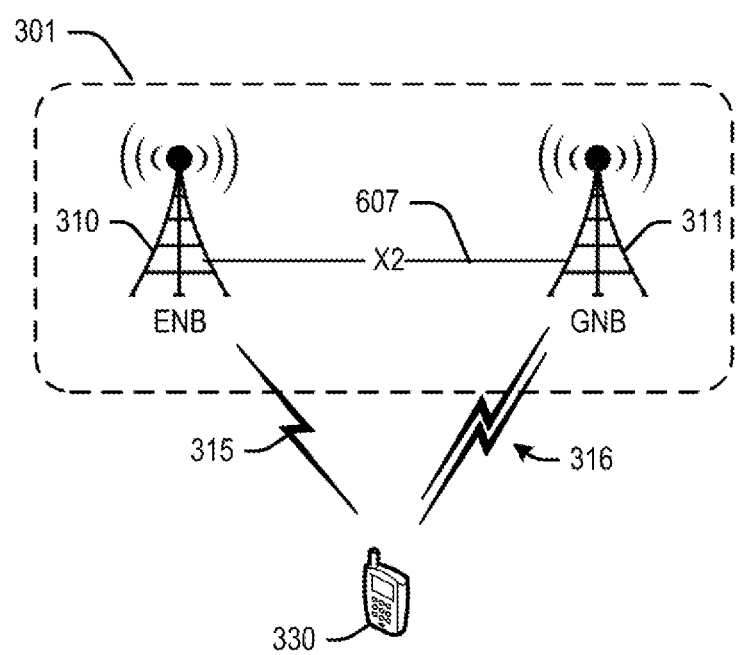
FIG. 3 depicts an exemplary collocated access node in a dual-connectivity network.

FIG. 3 depicts an exemplary collocated 5G EN-DC radio access network (RAN) 301. RAN 301 includes colocated access nodes 310, 311, and may include other components not shown herein for convenience, such as cell site routers, controllers, etc. Further, RAN 301 may be connected to other intermediate or core networks. In this exemplary embodiment, access node 310 can include an eNodeB, and access node 311 can include a gNodeB. For example, access node 310 can be configured to deploy a wireless interface 315 using a first radio access technology (RAT), e.g. 4G LTE, and access node 311 can be configured to deploy a second wireless interface 316 using a second RAT, e.g. 5G NR. Each RAT can be configured to utilize a different frequency band or sub-band, a different channel size or bandwidth, and so on. For example, the 5G NR wireless interface 316 can be configured to utilize higher frequencies and larger channel bandwidths than the 4G LTE wireless air interface 315.

Further, access nodes 310, 311 can be configured to communicate using both RATs at the same time. For example, dual connections can be set up with any of wireless devices 330 using both 4G and 5G wireless air interfaces 315, 316, the 4G wireless air interface 315 being used to transmit control information, and the 5G wireless air interface 316 being used to transmit data information. For example, a processing node within RAN 301 (for example, communicatively coupled to access nodes 310, 311, or any other network node) can be configured to determine whether or not wireless devices 330 are capable of communicating using both RATs (e.g. capable of 5G EN-DC), and instruct the access node 310 to broadcast an indicator in, for example, a system information message. Responsive to the indicator, wireless devices 330 can attach to access node 310 which can use the 4G carrier to control and set up a dual connectivity session with the wireless devices 330. In other words, control information (including SIB messages) is transmitted from the access node 310 using the 4G LTE wireless air interface, while the 5G NR wireless air interface is utilized for transmission of data via access node 311. Using the 5G RAT for data transmissions is advantageous, as 5G provides higher bandwidths and frequencies versus 4G. In addition, while different carriers offer different channel bandwidths, certain combinations of carriers may provide a greater aggregate channel bandwidth. Further, within radio access network 302, access nodes 310 and 311 can be coupled via a direct communication link 307, which can include an X2 communication link. Access nodes 310 and 311 can communicate control and data information across X2 communication link 307. In an exemplary embodiment, access node 311 includes logic to determine how to allocate data packets between access node 310 and access node 311, wherein the data packets flow between wireless devices 330 and any external network node. Such logic may include a packet data convergence protocol (PDCP) function. Thus, RAN 301 can include a plurality of antenna elements (not shown herein) coupled to access nodes 310 and 311, with different antenna elements configured to deploy a different radio air interface using a different frequency.

Further, the processing node within RAN 301 can be configured to perform methods for selectively assigning uplink transmission layers, by determining that an uplink usage of a wireless device 330 meets a threshold, and instructing the wireless device 330 to utilize an additional orthogonal layer for uplink transmissions. Another method for selectively assigning uplink transmission layers can include monitoring an uplink usage of wireless device 330 and, based on the uplink usage, adjusting a number of transmission layers utilized for uplink transmissions from the wireless device 330. Alternatively or in addition, a method for selectively assigning uplink transmission layers can include determining that a wireless device 330 within a threshold distance of a serving access node (i.e. one or both of eNodeB access node 310 or gNodeB access node 311) has an uplink usage that meets a threshold, and instructing the wireless device to utilize additional transmission layers for uplink transmissions. As described herein, the wireless device can be configured to utilize a first antenna for the uplink transmissions, and the methods can further include instructing the wireless device 330 to utilize the first antenna for the additional orthogonal layer. Determining that an uplink usage of a wireless device 330 meets a threshold can be based on a resource consumption of the wireless device 330. Alternatively or in addition, determining that an uplink usage of a wireless device 330 meets a threshold is based on a type of the uplink transmissions. Further, determining that an uplink usage of a wireless device 330 meets a threshold is based on a time of day based on, for instance, records of past trends of uplink usage at different times.

Figure 4:
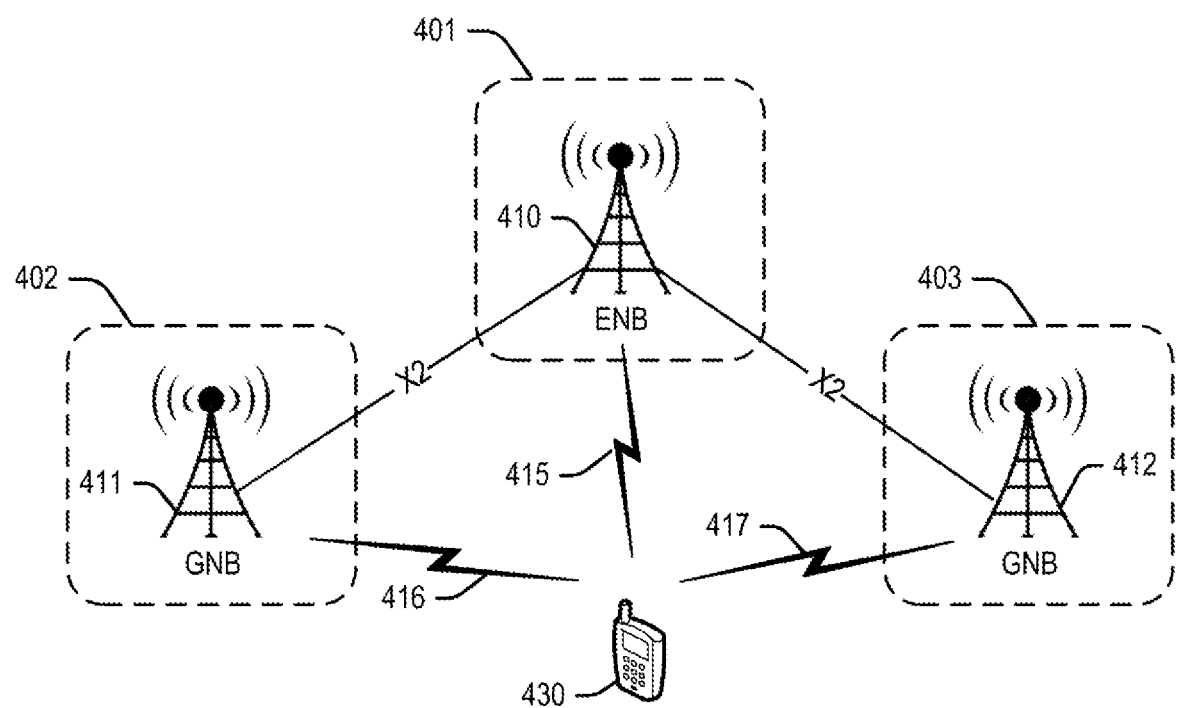
FIG. 4 depicts exemplary distributed access nodes in a dual-connectivity network.

FIG. 4 depicts an exemplary distributed 5G EN-DC system. Each of RANs 401, 402, 403 includes at least access nodes 410, 411, 412 respectively. This embodiment depicts a one-to-many configuration, in which an eNodeB access node 410 is designated as a primary access node for wireless devices 430, and one or more gNodeB access nodes 411, 412 are selected as secondary access nodes, as further described below. Persons having ordinary skill in the art may note that other components may be included in any combination, without materially affecting the scope and spirit of the described embodiments.

In this exemplary embodiment, access node 410 can include an eNodeB, and access nodes 411, 412 can include gNodeBs. For example, access node 410 can be configured to deploy a wireless interface 415 using a first radio access technology (RAT), e.g. 4G LTE, and access nodes 411, 412 can be configured to deploy wireless interfaces using a second RAT, e.g. 5G NR. Further, access nodes 410, 411, 412 can be configured to communicate using both RATs at the same time. For example, dual connections can be set up with wireless devices 430 using both 4G and 5G air interfaces respectively, the 4G wireless interface 415 being used to transmit control information, and one of the 5G wireless interfaces (e.g. 5G interface 416) being used to transmit data information. For example, a processing node communicatively coupled to access node 410 can be configured to determine whether or not wireless devices 430 are capable of communicating using both RATs (e.g. capable of 5G EN-DC), and instruct the access node 410 to broadcast an indicator in, for example, a system information message. Responsive to the indicator, wireless devices 430 can attach to access node 410 which can use the 4G carrier to control and set up a dual connectivity session with wireless devices 430. Further, access node 410 can be configured to select one (or more) of access nodes 411, 412 as a secondary access node, to transport user data. In other words, control information (including SIB messages) is transmitted from the access node 410 using the 4G LTE air interface, while the 5G NR air interfaces (e.g. 5G NR air interface 416) is utilized for transmission of data. Further, access nodes 411 and 412 (hereinafter "secondary access nodes") can each be coupled to access node 410 (hereinafter "primary access node") via X2 communication links. In an exemplary embodiment, each secondary access node 411, 412 can include logic to determine how to allocate data packets between the access nodes, wherein the data packets flow between wireless devices 430 and a network node not shown herein. Such logic may include a packet data convergence protocol (PDCP) function. Further, a processing node communicatively coupled to any of access nodes 410, 411, 412 can be configured to perform methods for selectively assigning uplink transmission layers as described throughout this disclosure, including with respect to FIGS. 5-6 below.

Figure 5:
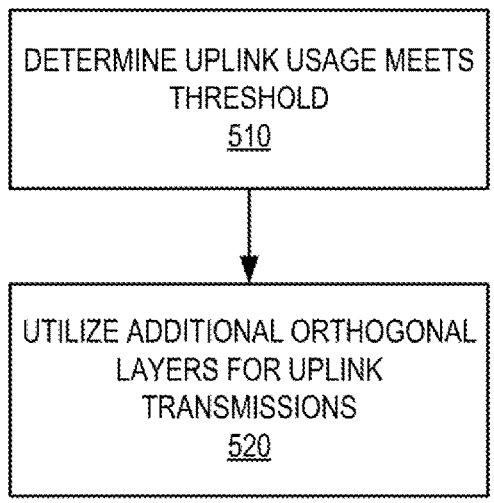
FIG. 5 depicts an exemplary method for selectively assigning uplink transmission layers.

FIG. 5 depicts an exemplary method for selectively assigning uplink transmission layers. The method of FIG. 5 may be implemented by a processing node communicatively coupled to one or more access nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, it is determined that an uplink usage of a wireless device meets a threshold, and at 520, the wireless device is instructed to utilize an additional orthogonal layer for uplink transmissions. Determining that an uplink usage meets a threshold can be based on a resource consumption of the wireless device. For example, frequency and time resources utilized by the wireless device for uplink transmissions can be monitored, and if the resource and/or time resource consumption exceeds a threshold, then the method is executed. Alternatively or in addition, determining that the uplink usage meets a threshold is based on a type of the uplink transmissions. For example, using certain services requires more resources than others. Uploading multimedia content requires more resources than uploading voice data, for example. Thus, certain types of transmissions can trigger the method. Further, determining that the uplink usage meets a threshold is based on a time of day at which the resource consumption is known or predicted to be high.

Further as described herein, the wireless device can be configured to utilize a first antenna for the uplink transmissions, and the methods can further include instructing the wireless device to utilize the first antenna for the additional orthogonal layer. Further, the wireless device can be configured to utilize a first antenna for uplink transmissions using a first radio access technology (RAT) and a second antenna uplink transmissions using a second RAT, wherein the first RAT utilizes a lower frequency than the second RAT. In this embodiment, the method can further include determining that the wireless device is within than a threshold distance from the serving access node, and instructing the wireless device to utilize the first antenna for the additional orthogonal layer. The method can further include determining that the wireless device is further than a threshold distance from the serving access node, instructing the wireless device to stop transmitting uplink data via the second antenna, and instructing the wireless device to utilize the first antenna for the additional orthogonal layer.

Figure 6:
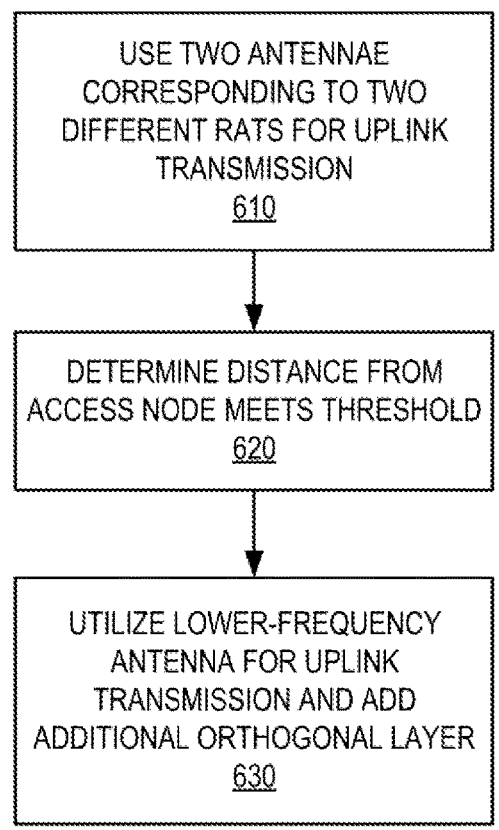
FIG. 6 depicts another exemplary method for selectively assigning uplink transmission layers.

FIG. 6 depicts an exemplary method for selectively assigning uplink transmission layers. The method of FIG. 6 may be implemented by a processing node communicatively coupled to one or more access nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, a wireless device is configured to utilize two antennae for uplink transmissions, wherein the two antennae are each configured to utilize a different RAT or frequency.

For example, as described herein, wireless devices can be configured to utilize dual-connectivity for uplink transmissions. The wireless device can further be configured to transmit uplink data on one or more orthogonal transmission layers from each antenna. For example, as has been described herein, the wireless device can be instructed to add transmission layers (using each antenna) based on an uplink usage and other characteristics such as type of transmission, time of day, distance from a serving access node, and so on. In an exemplary embodiment, each additional transmission layer is separated from the existing transmission layer by a code division multiplexing (CDM) code.

Thus, at 620, a distance of the wireless device from the serving access node may meet a threshold. Based on the distance from the access node, certain frequencies may be encouraged or discouraged for uplink transmissions. For example, higher frequencies can be used for uplink transmissions from a wireless device that is closer to a serving access node than a threshold distance. Wireless devices can maintains dual-connectivity for its uplink transmission, while further being instructed to add additional uplink transmission layers. In an exemplary embodiment, at 620 if the distance meets a threshold, then at 630 the wireless device can be instructed to instead utilize lower frequencies for uplink transmissions. This can be enabled by instructing the wireless device to utilize only one type of antenna (e.g. the antenna associated with the lower frequencies) for uplink transmissions. Further, the wireless device can be instructed to add additional transmission layers using the lower frequency antenna, to improve uplink throughput and maximize uplink coverage and capacity. Since using multiple antennae for uplink transmissions reduces a total amount of power available per antenna, adding transmissions layers to a single antenna (e.g. lower-frequency antenna) while disabling other antennae (e.g. higher-frequency antennae) can help maintain uplink transmission power, thereby ensuring higher uplink quality of service.

While 4G LTE and 5G NR are described in the above embodiments, the disclosed operations may apply to different combinations of radio air interfaces, including any combination of radio air interfaces within the same or different radio-access technologies, such as multiple different 4G carriers with different bandwidths, 5G carriers with different bandwidths, or any future wireless technology. So long as the described adjustment of maximum allowable transmit power based on density of access nodes is performed as described herein, the specific implementation and network topology is less relevant.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selectively assigning uplink transmission layers, the method comprising:
    determining that an uplink usage based on a type of uplink transmission of a wireless device that is farther than a threshold distance from a servicing access node meets a threshold, wherein the type of uplink transmission is multimedia content or voice data, and wherein the wireless device is configured to utilize a first antenna for uplink transmissions using a first radio access technology (RAT) and a second antenna for uplink transmissions using a second RAT, and the first RAT utilizes a lower frequency than the second RAT;
    instructing the wireless device to stop transmitting uplink data via the second antenna;
    based on meeting the threshold, instructing the wireless device to utilize an additional orthogonal layer for uplink transmissions;
    instructing the wireless device to utilize the first antenna for the additional orthogonal layer.

2. The method of claim 1, wherein the wireless device is configured to utilize a first antenna for the uplink transmissions, the method further comprising instructing the wireless device to utilize the first antenna for the additional orthogonal layer.

3. The method of claim 1, further comprising:
    determining that the wireless device is within than a threshold distance from a serving access node; and
    instructing the wireless device to utilize the first antenna for the additional orthogonal layer.

4. The method of claim 1, wherein determining that an uplink usage of a wireless device meets a threshold is based on a resource consumption of the wireless device.

5. The method of claim 1, wherein determining that an uplink usage of a wireless device meets a threshold is based on a time of day.

6. A processing node for selectively assigning uplink transmission layers, the processing node being configured to perform operations comprising:
    determining that a wireless device within a threshold distance of a serving access node has an uplink usage based on a type of uplink transmission that meets a threshold, wherein the type of uplink transmission is multimedia or voice data, and wherein the wireless device is configured to utilize a first antenna for uplink transmissions using a first radio access technology (RAT) and a second antenna for uplink transmissions using a second RAT, and the first RAT utilizes a lower frequency than the second RAT;
    instructing the wireless device to stop transmitting uplink data via the second antenna;

based on meeting the threshold, instructing the wireless device to utilize an additional orthogonal layer for uplink transmissions; and instructing the wireless device to utilize the first antenna for the additional orthogonal layer.

7. The processing node of claim 6, wherein the operations further comprise instructing the wireless device to utilize the first antenna for one or more additional transmission layers.

8. The processing node of claim 6, wherein determining that an uplink usage of a wireless device meets a threshold is based on a resource consumption of the wireless device.

9. A system for selectively assigning uplink transmission layers, the system comprising:
 a processing node; and
 a processor coupled to the processing node, the processor being configured to perform operations comprising:
 determining that an uplink usage based on a type of uplink transmission of a wireless device that is farther than a threshold distance from a servicing access node meets a threshold, wherein the type of uplink transmission is multimedia content or voice data, and wherein the wireless device is configured to utilize a first antenna for uplink transmissions using a first radio access technology (RAT) and a second antenna for uplink transmissions using a second RAT, and the first RAT utilizes a lower frequency than the second RAT;

instructing the wireless device to stop transmitting uplink data via the second antenna;

based on meeting the threshold, instructing the wireless device to utilize an additional orthogonal layer for uplink transmissions;

instructing the wireless device to utilize the first antenna for the additional orthogonal layer.

10. The system of claim 9, wherein the wireless device is configured to utilize a first antenna for the uplink transmissions, the method further comprising instructing the wireless device to utilize the first antenna for the additional orthogonal layer.

11. The system of claim 9, further comprising:
 determining that the wireless device is within than a threshold distance from a serving access node; and
 instructing the wireless device to utilize the first antenna for the additional orthogonal layer.

12. The system of claim 9, wherein determining that an uplink usage of a wireless device meets a threshold is based on a resource consumption of the wireless device.

13. The system of claim 9, wherein determining that an uplink usage of a wireless device meets a threshold is based on a time of day.

* * * * *